United States Patent [19]

Salkeld

[11] Patent Number: 5,090,642
[45] Date of Patent: Feb. 25, 1992

[54] PROJECTILE DELIVERY SYSTEM

[76] Inventor: Robert J. Salkeld, 920 Louisiana S.E. #88, Albuquerque, N. Mex. 87108

[21] Appl. No.: 483,042

[22] Filed: Feb. 20, 1990

[51] Int. Cl.$^5$ ............................................. B64G 1/14
[52] U.S. Cl. ........................... 244/158 R; 89/1.57; 89/1.815; 244/2; 244/137.1
[58] Field of Search ............ 244/1 R, 2, 137.4, 158 R, 244/160, 172, 137.1; 89/1.11, 1.54, 1.57, 1.51, 1.815, 1.8

[56] References Cited

U.S. PATENT DOCUMENTS 3,517,584  6/1970  Robinson et al. ................ 244/137.1
3,702,688  11/1972  Faget ..................................... 244/2

FOREIGN PATENT DOCUMENTS 3002551  7/1981  Fed. Rep. of Germany ... 244/158 R

OTHER PUBLICATIONS

Bethe et al., "Space Based Ballistic Missle Defense", *Scientific America*, Oct. 1984, vol. 251, 190 4.

*Primary Examiner*—Galen Barefoot
*Attorney, Agent, or Firm*—Lyon & Lyon

[57] ABSTRACT

A first stage earth to low orbit shuttle having mixed-mode propulsion and dual fuel rocket engines. A cargo bay is designed to receive a second stage dart vehicle capable of attaining geosynchronous orbit, deep space and lunar capabilities from launch at low earth orbit from the space shuttle. Upon return from geosynchronous orbit, the dart vehicle would reenter the atmosphere, and rebound toward an outward trajectory. At this point, projectiles would be launched for reentry and the dart vehicle can deviate cross range to a landing site.

2 Claims, 11 Drawing Sheets

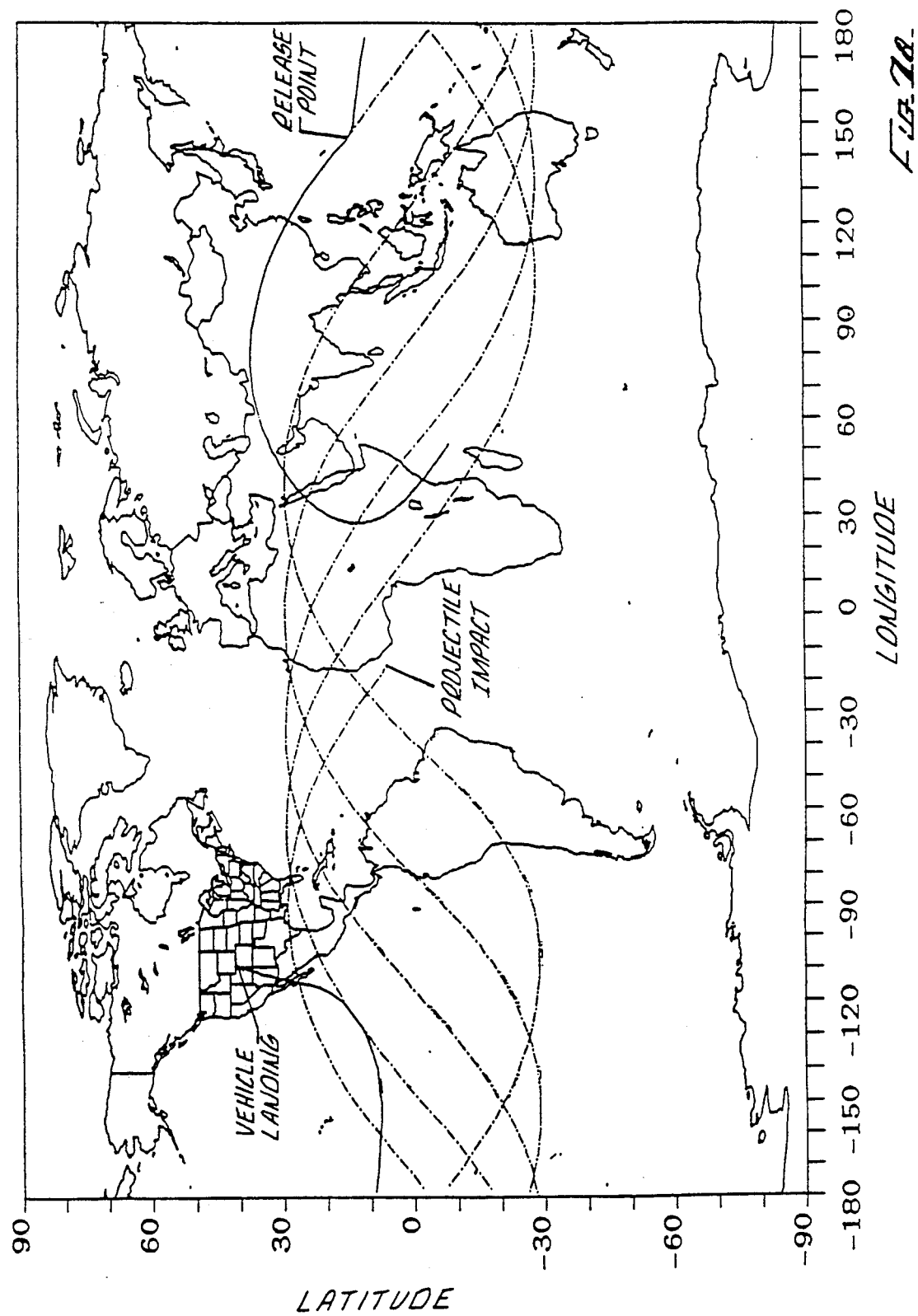

FIG. 12

| | | | | | | | |
|---|---|---|---|---|---|---|---|
| 1 | 0.0000 | 0.0000 | 0.0000 | 21 | 703.0354 | 0.0000 | 0.0000 |
| 2 | 0.1757 | -0.0762 | 0.2880 | 22 | 667.8836 | 0.2318 | -0.8757 |
| 3 | 0.3515 | -0.1034 | 0.3908 | 23 | 632.7318 | 0.454 | -1.7190 |
| 4 | 0.5273 | -0.1211 | 0.4577 | 24 | 562.4283 | 0. | -3.4039 |
| 5 | 0.7030 | -0.1332 | 0.5031 | 25 | 492.1247 | 1.3396 | -5.0614 |
| 6 | 3.5151 | -0.3444 | 1.3014 | 26 | 421.8212 | 1.7226 | -6.5084 |
| 7 | 8.7879 | -0.5248 | 1.9828 | 27 | 351.5177 | 2.0066 | -7.5815 |
| 8 | 17.5759 | -0.7231 | 2.7322 | 28 | 281.2142 | 2.1398 | -8.0849 |
| 9 | 35.1517 | -0. 69 | 3.7665 | 29 | 210.9106 | 2.0721 | -7.8292 |
| 10 | 70.3035 | -1.3704 | 5.1779 | 30 | 140.6071 | 1.8301 | -6.9147 |
| 11 | 140.6071 | -1.8301 | 6. 147 | 31 | 70.3035 | 1.3704 | -5.1779 |
| 12 | 210.9106 | -2.0721 | 7.8292 | 32 | 35.1517 | 0.9969 | -3.76 5 |
| 13 | 281.2142 | -2.1398 | 8.0849 | 33 | 17.5759 | 0.7231 | -2.7322 |
| 14 | 351.5177 | -2.0066 | 7.5815 | 34 | 8.7879 | 0.6248 | -1.9828 |
| 15 | 421. 212 | -1.7226 | 6.5084 | 35 | 3.5151 | 0.3444 | -1.3013 |
| 16 | 492.1247 | -1.2396 | 5.0614 | 36 | 0.7030 | 0.1331 | -1.5031 |
| 17 | 562.4283 | -0. 9 | 3.4039 | 37 | 0.5273 | 0.1211 | -1.4577 |
| 18 | 632.7318 | -0.4550 | 1.7190 | 38 | 0.3515 | 0.1034 | -0.3908 |
| 19 | 667.8 36 | -0.2318 | 0.8757 | 39 | 0.1757 | 0.0762 | -0.2880 |
| 20 | 703.0354 | 0.0000 | 0.0000 | 40 | 0.0000 | 0.0000 | 0.0000 |

| | | | | | | | |
|---|---|---|---|---|---|---|---|
| 1 | -0.0002 | 0.0000 | 0.0000 | 21 | 210.0000 | 0.0000 | 0.0000 |
| 2 | 0.0523 | -0.1530 | 0.1870 | 22 | 199.5000 | 0.4653 | -0.5686 |
| 3 | 0.1048 | -0.2077 | 0.2537 | 23 | 189.0000 | 0.9134 | -1.1162 |
| 4 | 0.1573 | -0.2432 | 0.2971 | 24 | 168.0000 | 1.3088 | -2.2104 |
| 5 | 0.2098 | -0.2673 | 0.3266 | 25 | 146.9999 | 2.6895 | -3.2866 |
| 6 | 1.0498 | -0.6915 | 0.8450 | 26 | 125.9999 | 3.4585 | -4.2263 |
| 7 | 2.6248 | -1.0536 | 1.2875 | 27 | 104.9999 | 4.0287 | -4.9231 |
| 8 | 5.2498 | -1.4519 | 1.7741 | 28 | 83.9999 | 4.2962 | -5.2500 |
| 9 | 10.4998 | -2.0015 | 2.4457 | 29 | 62.9999 | 4.1603 | -5.0839 |
| 10 | 20.9998 | -2.7515 | 3.3622 | 30 | 41.9999 | 3.6744 | -4.4901 |
| 11 | 41.9999 | -3.6744 | 4.4900 | 31 | 20.9998 | 2.7515 | -3.3623 |
| 12 | 62.9999 | -4.1604 | 5.0838 | 32 | 10.4998 | 2.0015 | -2.4458 |
| 13 | 83.9999 | -4.2963 | 5.2499 | 33 | 5.2498 | 1.4518 | -1.7742 |
| 14 | 104.9999 | -4.0288 | 4.9230 | 34 | 2.6248 | 1.0536 | -1.2876 |
| 15 | 125.9999 | -3.4585 | 4.2262 | 35 | 1.04 8 | 0.6915 | -0.8451 |
| 16 | 146.9999 | -2.6896 | 3.2866 | 36 | 0.2098 | 0.2673 | -0.3267 |
| 17 | 168.0000 | -1.8088 | 2.2103 | 37 | 0.1573 | 0.2432 | -0.2972 |
| 18 | 189.0000 | -0.9134 | 1.1161 | 38 | 0.1048 | 0.2077 | -0.2538 |
| 19 | 199.5000 | -0.4653 | 0.5636 | 39 | 0.0523 | 0.1530 | -0.1870 |
| 20 | 210.0000 | 0.0000 | 0.0000 | 40 | -0.0002 | 0.0000 | 0.0000 |

FIG. 13

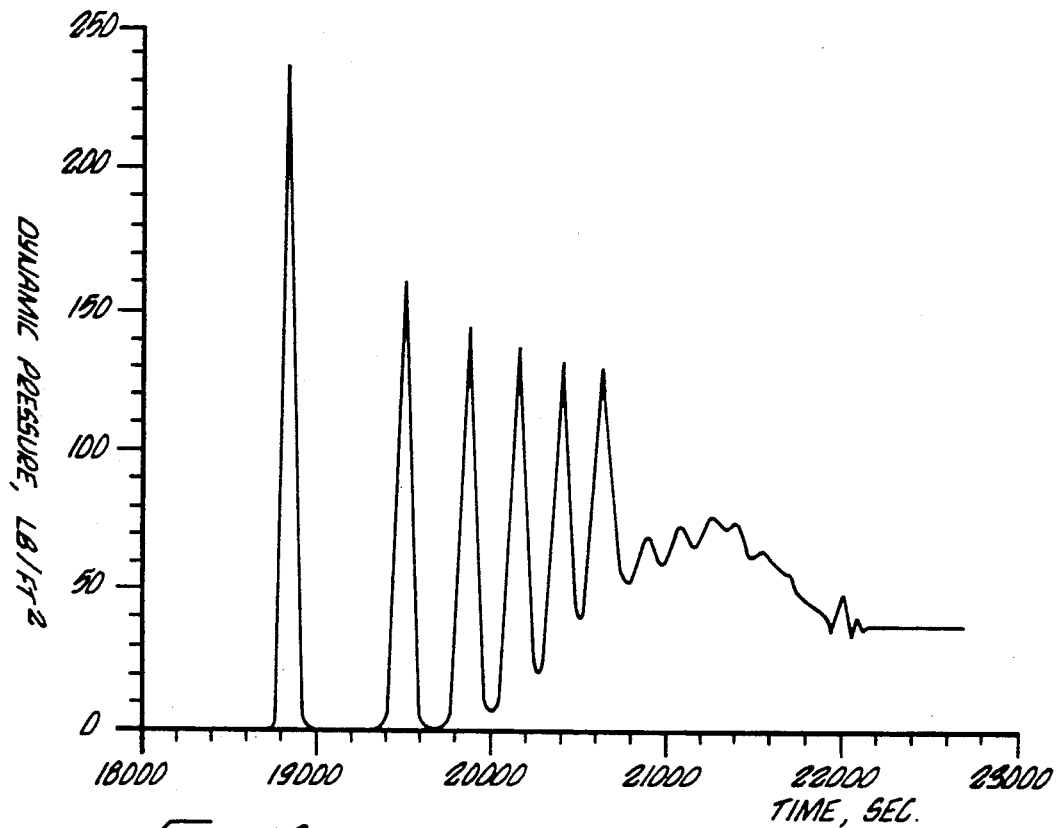
FIG. 16
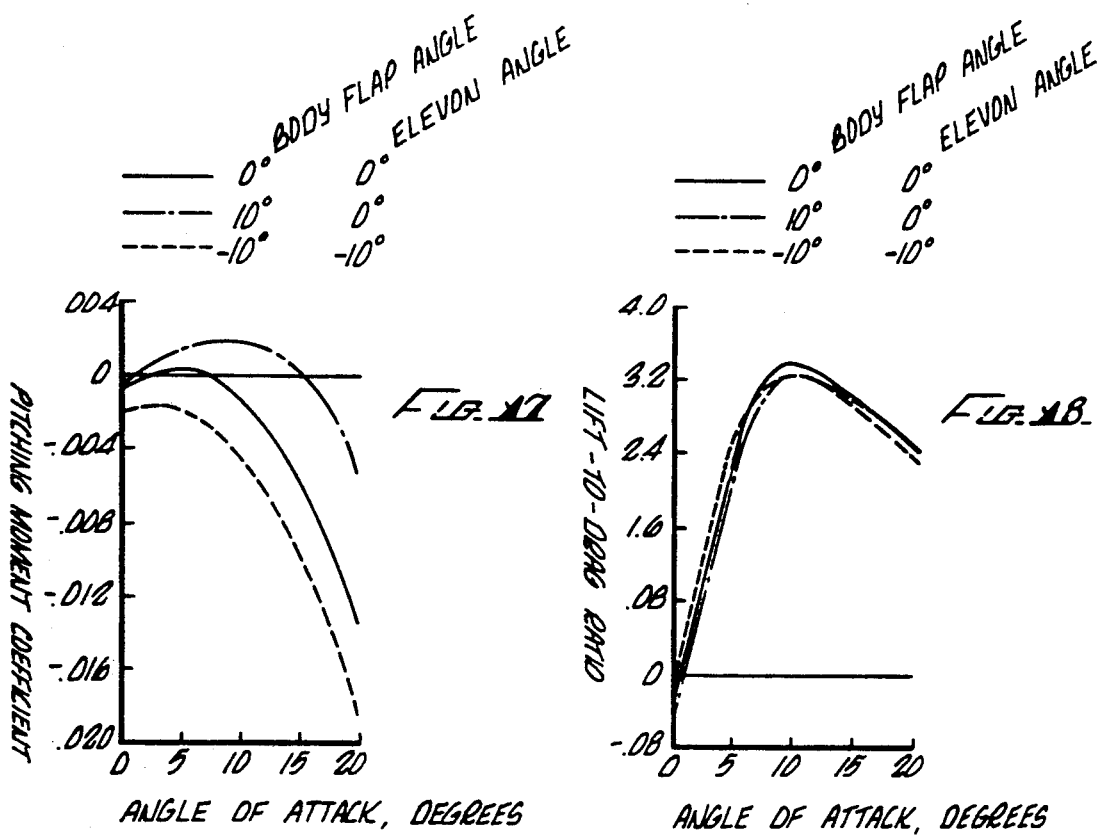
FIG. 17
FIG. 18

PROJECTILE DELIVERY SYSTEM

BACKGROUND OF THE INVENTION

The field of the present invention is space vehicles and delivery systems. A space shuttle system is now well known for the lifting of substantial payloads to low earth orbit. In addition to the current American space shuttle program, concepts have been developed for a first stage reusable single staged orbit shuttle. Such a system would likely employ mixed mode propulsion and duel fuel rocket engines in accordance with U.S. Pat. Nos. 3,910,037 and 3,955,784. Such systems are understood to lead to performance enhancement with vehicle size reductions leading to overall system costs savings. Such shuttle systems have contemplated cargo bays for the carrying of second stage vehicles for geocentric deployment as well as lunar and extraterrestrial, deep space activity.

A second stage far space shuttle, either manned or unmanned, has been described as compatible with and launched from a single stage to orbit shuttle in low earth orbit. Such a second stage has also been contemplated as being reusable and using a duel fuel oxygen-propane-hydrogen propulsion with duel expander rocket engines. Such a system provides for reduced size to make practical the deployment of such a second stage from the cargo bay of a first stage to low earth orbit vehicle. This second stage far space shuttle has further been contemplated for deployment in geosynchronous orbit and other distant locations.

Such a second stage vehicle has been defined as dart shaped with a high hypersonic lift-to-drag capability.

SUMMARY OF THE INVENTION

The present invention is directed to a system including apparatus and method for the delivery of a projectile. A first stage is contemplated which is designed to attain low earth orbit. A second stage contained within the cargo bay of the first stage is then contemplated to be launched into geosynchronous orbit. From a geosynchronous orbit, great versatility in range is possible along with advantageous deployment over friendly or neutral territory. A dart-shaped vehicle having aerodynamic maneuverability can be used for deploying a projectile for impact at a selected location far distant from the second stage vehicle.

Accordingly, it is an object of the present invention to provide apparatus and method for the selective deployment of a projectile. Other and further objects and advantages will appear hereinafter.

BRIEF DESCRIPTION OF THE DRAWINGS

FIG. 7A is a ground track for a vehicle and projectile released therefrom.

FIG. 12 illustrates the wing root section of this second stage.

FIG. 13 illustrates the V-tail root section of this second stage.

FIG. 16 illustrates dynamic pressure vs. time plot of the trajectory of the second stage upon reentry from geosynchronous orbit.

FIGS. 17 and 18 illustrate hypersonic longitudinal performance with FIG. 17 illustrating pitching movement coefficient and FIG. 18 illustrating lift to drag ratio for a proposed trajectory.

FIG. 23 illustrates the angle of attack vs. time while

DETAILED DESCRIPTION OF THE PREFERRED EMBODIMENT

Figure 1:
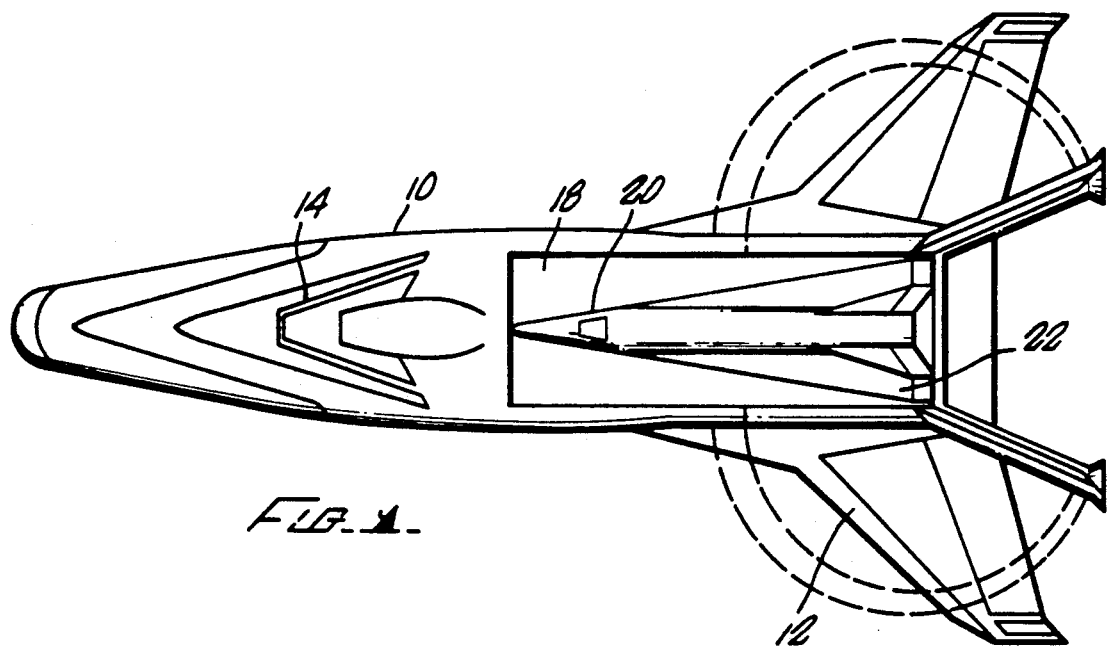
FIG. 1 is a plan view of a first stage shuttle illustrating a second stage dart vehicle positioned therein.
Figure 2:
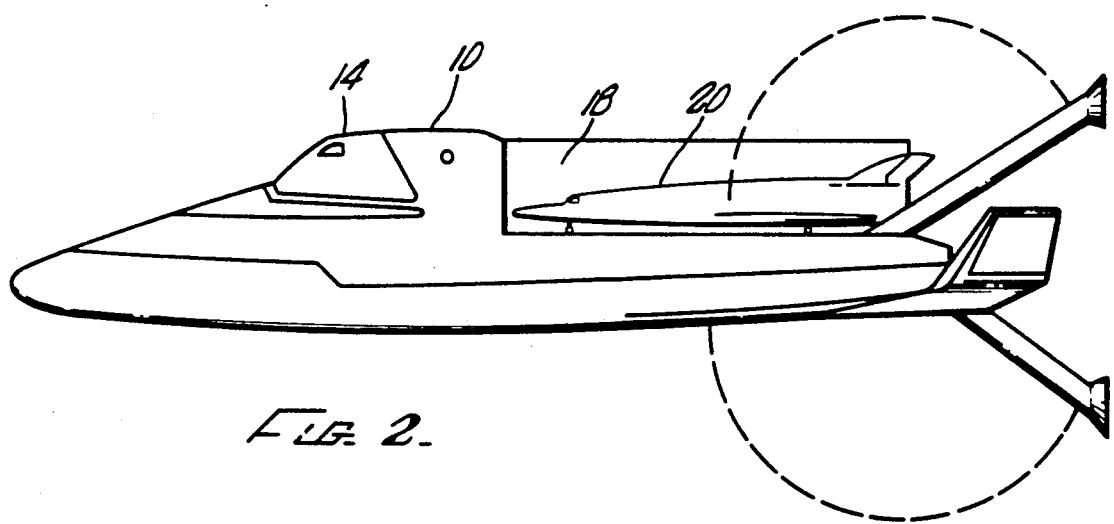
FIG. 2 is an elevation view of the assembly of FIG. 1.
Figure 3:
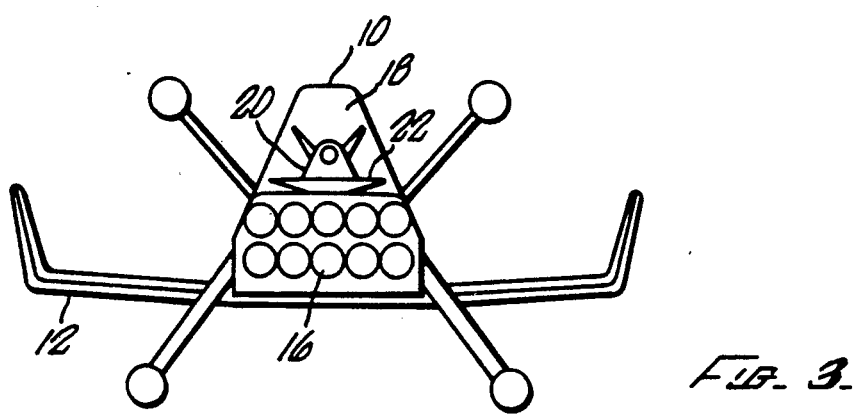
FIG. 3 is an end view of the assembly of FIG. 1.
Figure 4:
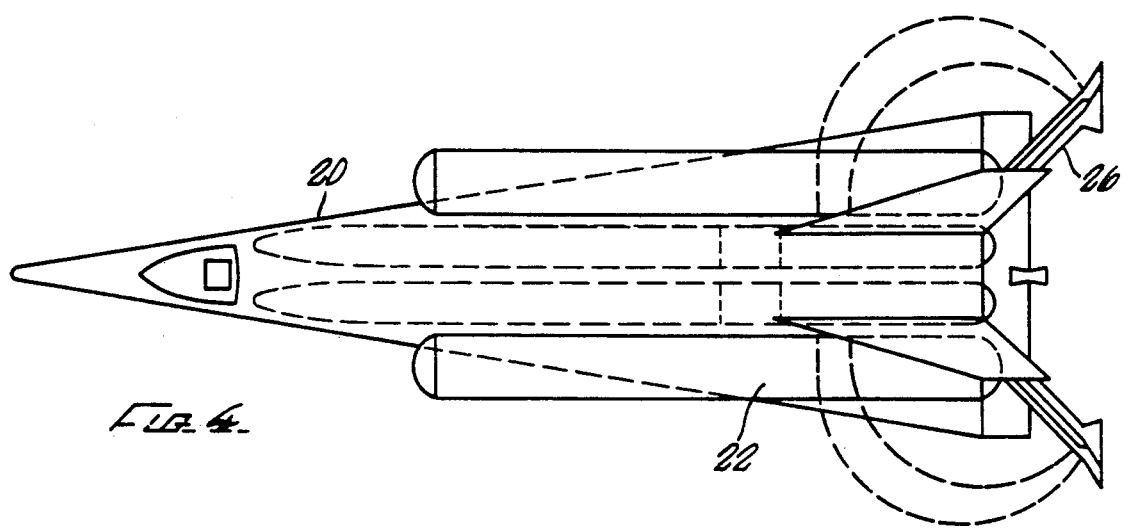
FIG. 4 is a plan view of a second stage shuttle.
Figure 5:
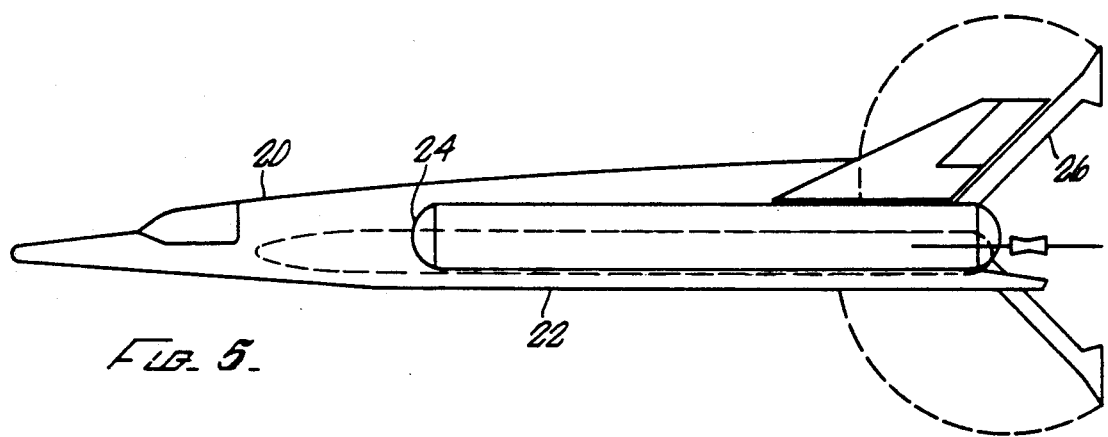
FIG. 5 is an elevation view of the second stage shuttle of FIG. 4.
Figure 6:
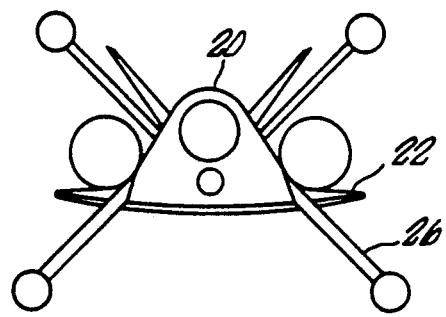
FIG. 6 is an end view of the second stage shuttle of FIG. 4.

Turning in detail to the drawings, schematics of a first-stage to orbit space shuttle 10 are illustrated in FIGS. 1-3. The first-stage space to orbit space shuttle 10 is capable of low earth orbit and includes aerodynamic surfaces 12, a crew area 14, engines 16 and a cargo bay 18. Mix-mode propulsion and duel rocket engines are contemplated in accordance with U.S. Pat. Nos. 3,910,037 and 3,955,784, the disclosure of which is incorporated herein by reference. Multi-stage deployment systems, both manned and unmanned, are also possible for satisfaction of the mission and are contemplated as part of the single stage as defined herein. The technology has already been developed through the American Space Shuttle Program which is necessary for implementation of the present system.

Accompanying the shuttle to low earth orbit is a second stage dart vehicle 20. This vehicle is sized to fit within the cargo bay 18 for deployment from a low earth orbit from the first stage shuttle. The second stage dart vehicle as well as the first stage space shuttle are contemplated to be reusable. The dart vehicle includes aerodynamic control surfaces 22 with the vehicle having a high hypersonic lift-to-drag ratio. This vehicle is contemplated to be capable of geosynchronous orbit and also includes a cargo bay 24.

Given the current state of technology, the following appear to be appropriate parameters for these vehicles. The payload to be carried from low earth orbit to geosynchronous orbit on the second stage 20 is determined to be 5,000 LBM. The second stage 20 is to have the capability to return the 5,000 LBM payload to earth, either through targeted trajectory delivery or in the cargo bay. The payload density is to be 5.0 LBM/FT$^3$. The gross start weight would be 87,000 LBM with a dry weight of 18,500 LBM. The engine is to be 1×20 KLBM (vacuum) $O_2/C_3H_8/H_2$ dual expander rocket. The cross range of the vehicle from geosynchronous orbit is 45000 nautical miles. The dimensions of the vehicle without landing gear are to be 82.5' in length, 26.7' in width and 13.7' in height.

Given the foregoing parameters, the first stage to low earth orbit shuttle would have a payload capacity to low earth orbit of 87000 LBM. The gross weight of the first stage would be 3,524,000 LBM with a dry weight of 278,800 LBM. The engines would be 10×450 KLBF (sea level) $O_2/C_3H_8/H_2$ dual expander rockets. The reentry platform loading would be 42 LBM/FT$^2$ with a payload density of 3.35 LBM/FT$^2$. The dimensions of such a vehicle would be 185' in length, 135' in width and 44' in height.

Contemplated as the payload for the second stage dart vehicle 20 would be projectiles which are to be returned via prescribed trajectories to earth. Such projectiles would include warheads or scientific measuring equipment. Traditional release techniques currently employed by the American Space Shuttle Program could be advantageously employed in this instance.

The second stage dart vehicle 20 may also be configured for deep space or lunar activity. To this end, retractable landing gear 26 are shown for vertical landing capability. Adding side tanks (oxygen/hydrogen), as shown, to the second stage 20 enables it to land upon the Moon and return to Earth.

The employment of the system is contemplated to include the launch of the assembled first stage, second stage and projectiles into low earth orbit. The second stage and projectiles are then separated from the first stage. The first stage would then return to earth either with or without the performance of other missions. The second stage vehicle 20 would then boost to geosynchronous orbit where it may be stationed over friendly or neutral territory without interference.

Figure 7B:
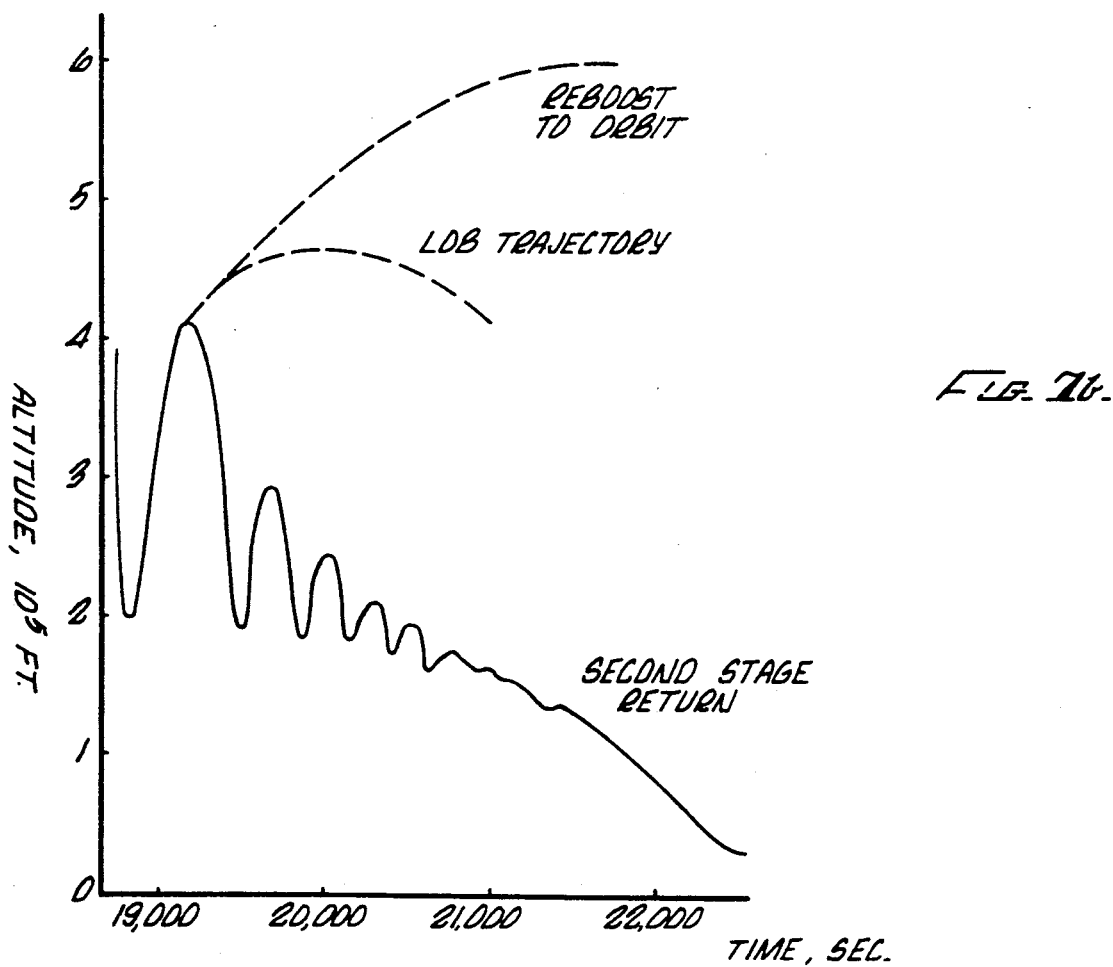
FIG. 7B is an altitude-versus-time plot for a reentering vehicle having the ground track of FIG. 7A.

At the appropriate time, the second stage 20 descends from geosynchronous orbit to enter the atmosphere following tracks as shown in FIGS. 7A and 7B. FIG. 7B illustrates the altitude vs. time for such a mission with a release of the projectile in a lob and with an alternate track for reboost of the second stage 20 to orbit. Upon entry into the atmosphere, the vehicle rebounds toward an outward trajectory. At this point, the projectiles may be launched in a lob trajectory. The trajectory has the potential for in excess of four earth orbits prior to projectile impact. The second stage vehicle can then be boosted back into orbit or diverted by as much as 4,500 miles to a landing in friendly territory. Capture and reentry strategy for the second stage, as optimized to maximize cross range, uses an initial roll angle of 93° with a change to 51° and finally to zero. Heating rates through reentry are accommodated by water cooling using systems already developed for other uses. Such a scenario is plotted in FIG. 7A on a ground track plot.

Figure 8:
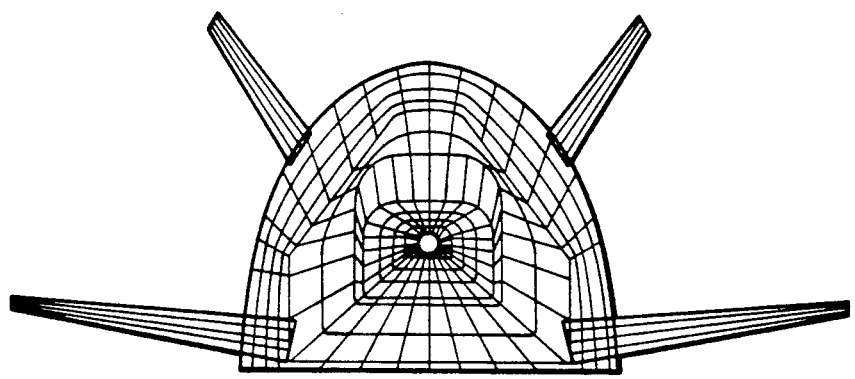
FIG. 8 is a front view of the dart vehicle as employed in the calculations of trajectory.
Figure 9:
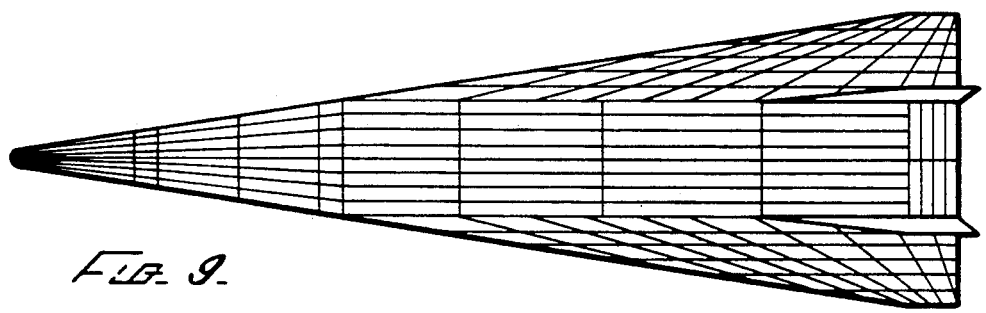
FIG. 9 is a top view of the dart vehicle as employed in the calculations of trajectory.
Figure 10:
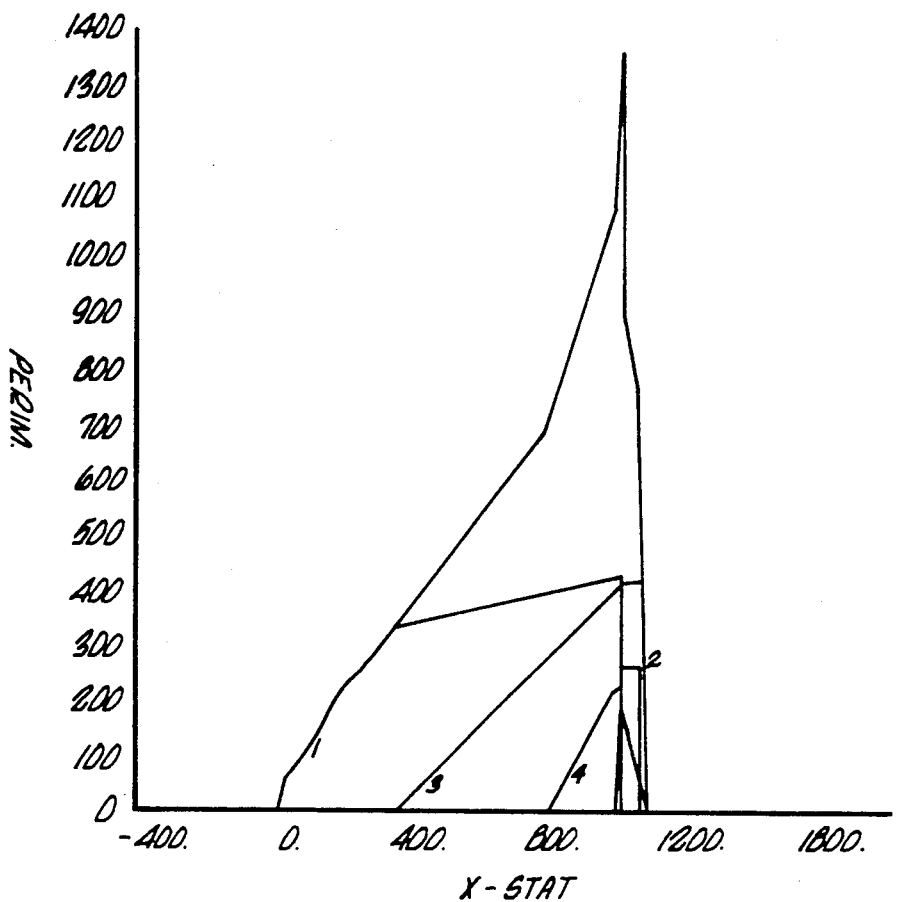
FIG. 10 graphs the wetted areas in square inches of the second stage as employed in the calculations of trajectory.

The assumptions made and resulting performance are illustrated in FIGS. 8 through 24. A front view of the dart vehicle 20 is illustrated in FIG. 8 with the V-tail 26 having a value for omega of the leading edge of 76.5° and a dihedral of 55°. The wing 28 has an omega of the leading edge of 81° and a dihedral of 7.5°. FIG. 9 illustrates a top view of the same vehicle as employed in the calculations. The wetted areas are shown in graph FIG. 10 in square inches with the center of the area at x=684.857 inches. From this, the wetted area is as follows:

| Symbol | Component | Wetted Area (in$^2$) |
|---|---|---|
| 1 | Modified fuselage | 319279.9 |
| 2 | body flap | 15502.8 |
| 3 | wing | 163619.5 |
| 4 | V-tails | 34734.9 |
| TOTAL | | 533137.0 |

Figure 11:
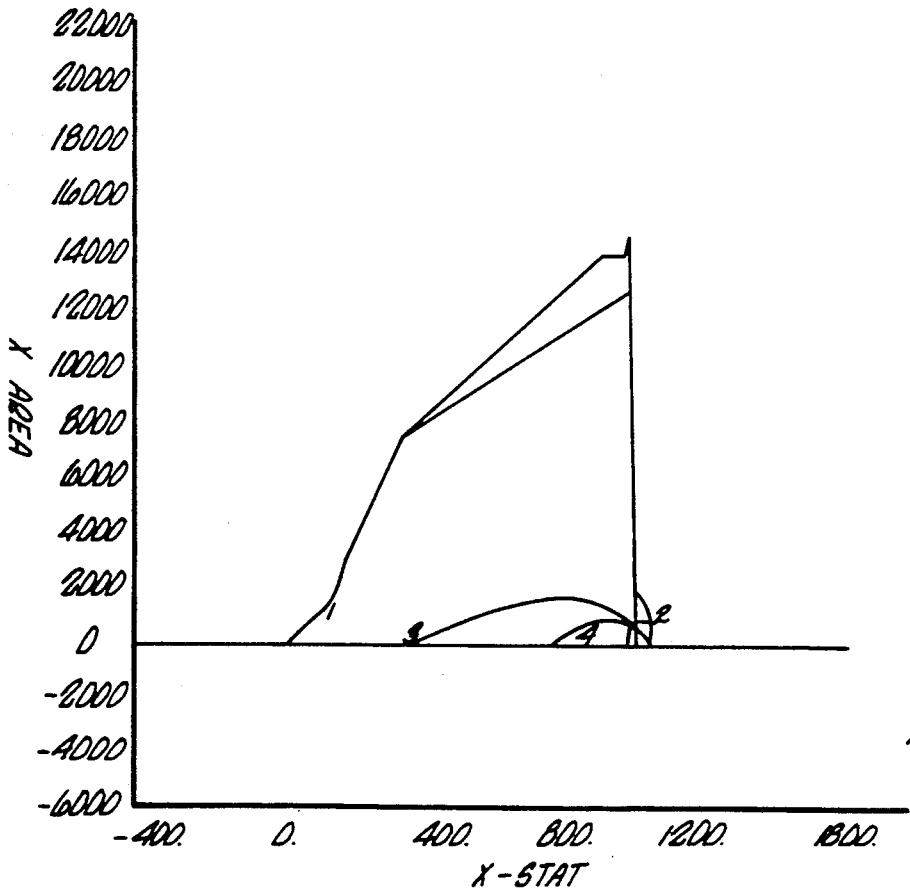
FIG. 11 graphs the volume of various components of the second stage as employed in the calculations of trajectory.

FIG. 11 establishes the volume of various components employed in the calculation. The center of volume is at x=644.691 inches with the following results:

| Symbol | Component | Volume (in$^3$) |
|---|---|---|
| 1 | Modified fuselage | 7608223.5 |
| 2 | body flap | 46749.6 |
| 3 | wing | 649182.6 |
| 4 | V-tails | 111548.9 |
| TOTAL | | 8415704.0 |

The wing root section is illustrated in FIG. 12 and the V-tail root section is illustrated in FIG. 13.

Figure 14:
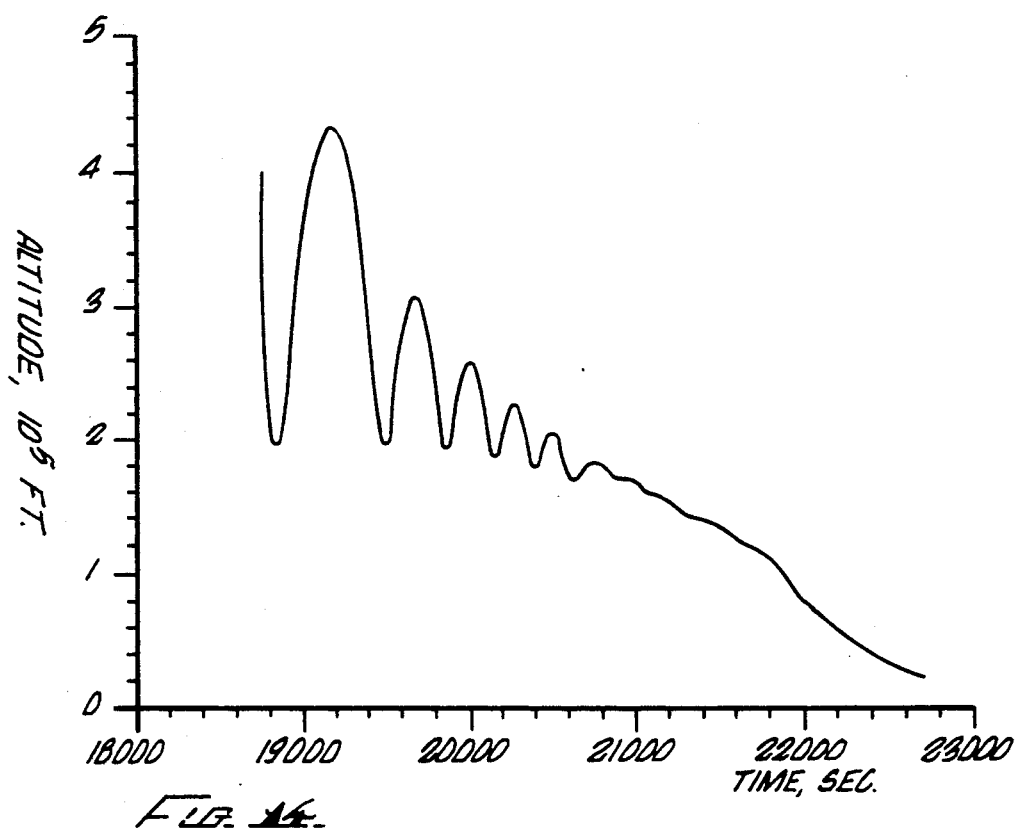
FIG. 14 illustrates an altitude vs. time plot of the trajectory of the second stage upon reentry from geosynchronous orbit.
Figure 15:
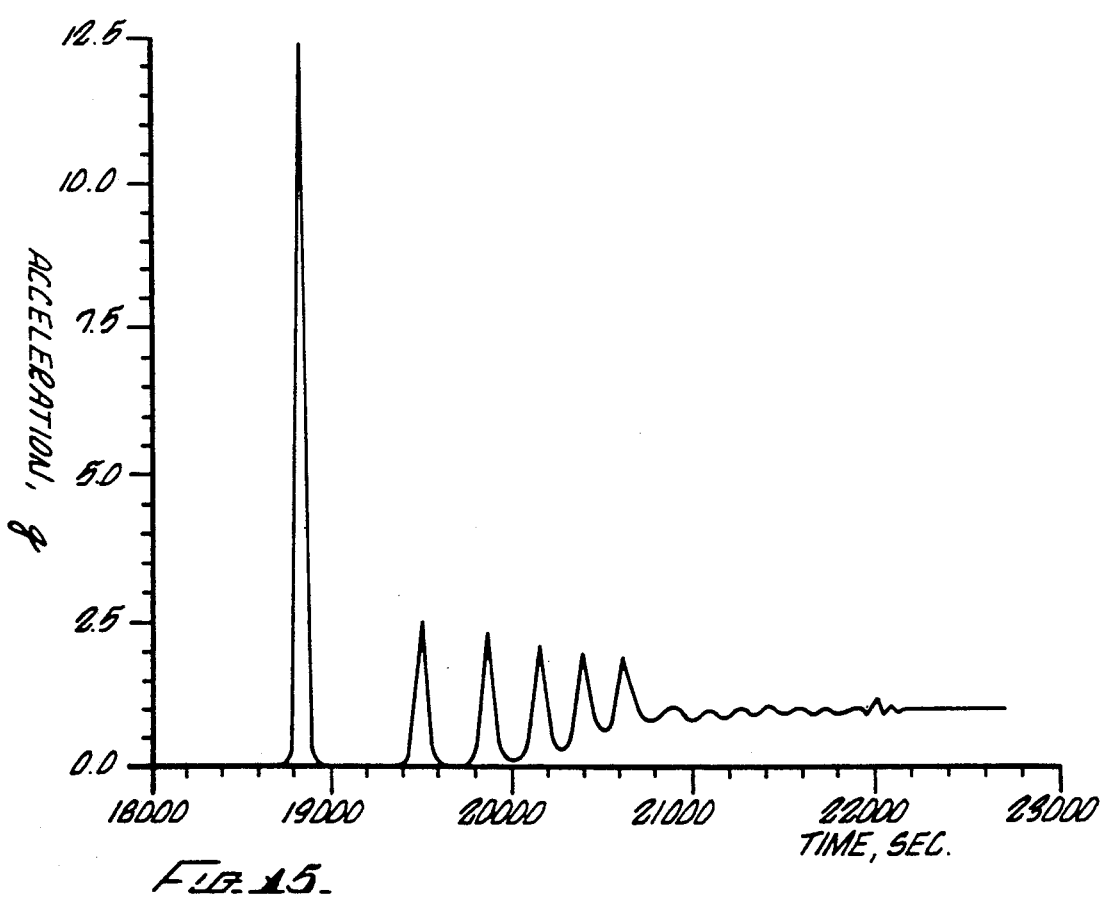
FIG. 15 illustrates an acceleration vs. time plot measured in g's of the trajectory of the second stage upon reentry from geosynchronous orbit.
Figure 19:
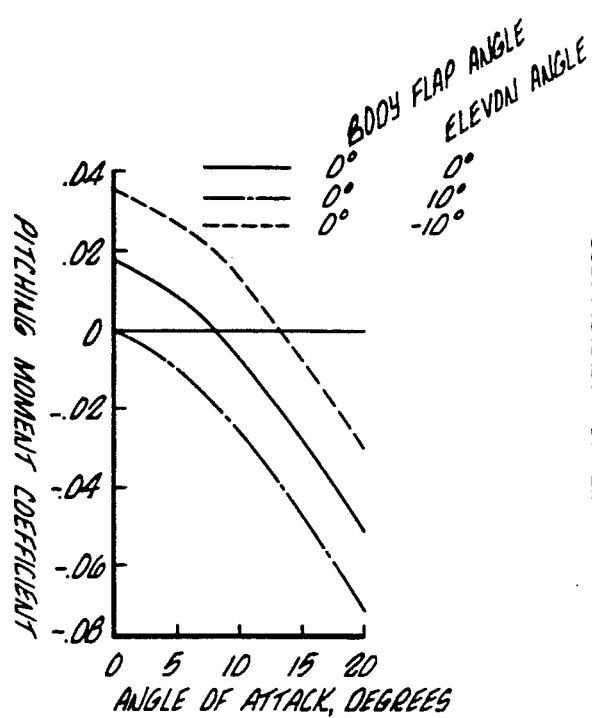
FIGS. 19 and 20 depict subsonic longitudinal performance for landing with FIG. 19 illustrating pitching movement coefficient and FIG. 20 illustrating coefficient of lift.
Figure 20:
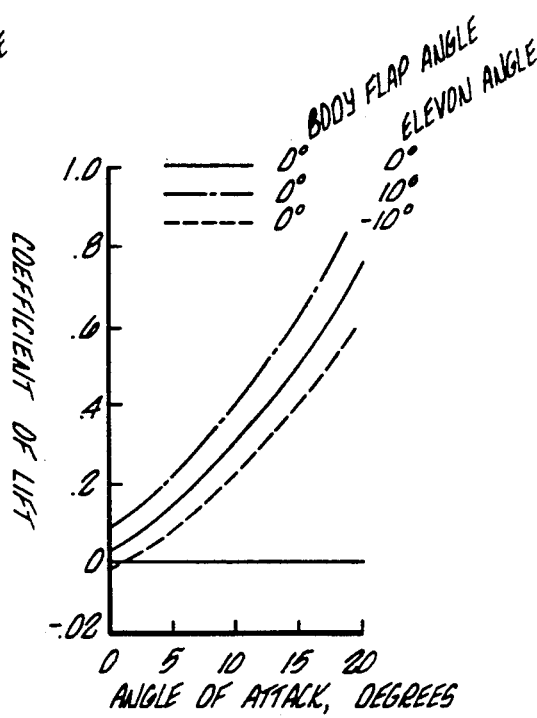

The results of a return of the foregoing vehicle from synchronous orbit is illustrated in FIGS. 14-24. FIG. 14 illustrates the altitude in time, FIG. 15 illustrates the acceleration vs. time measured in g's. FIG. 16 illustrates dynamic pressure vs. time. FIGS. 17 and 18 illustrate hypersonic longitudinal performance with FIG. 17 illustrating pitching movement coefficient and FIG. 18 illustrating lift to drag ratio. FIGS. 19 and 20 depict subsonic longitudinal performance for landing with FIG. 19 illustrating pitching movement coefficient and FIG. 20 illustrating coefficient of lift.

Figure 21:
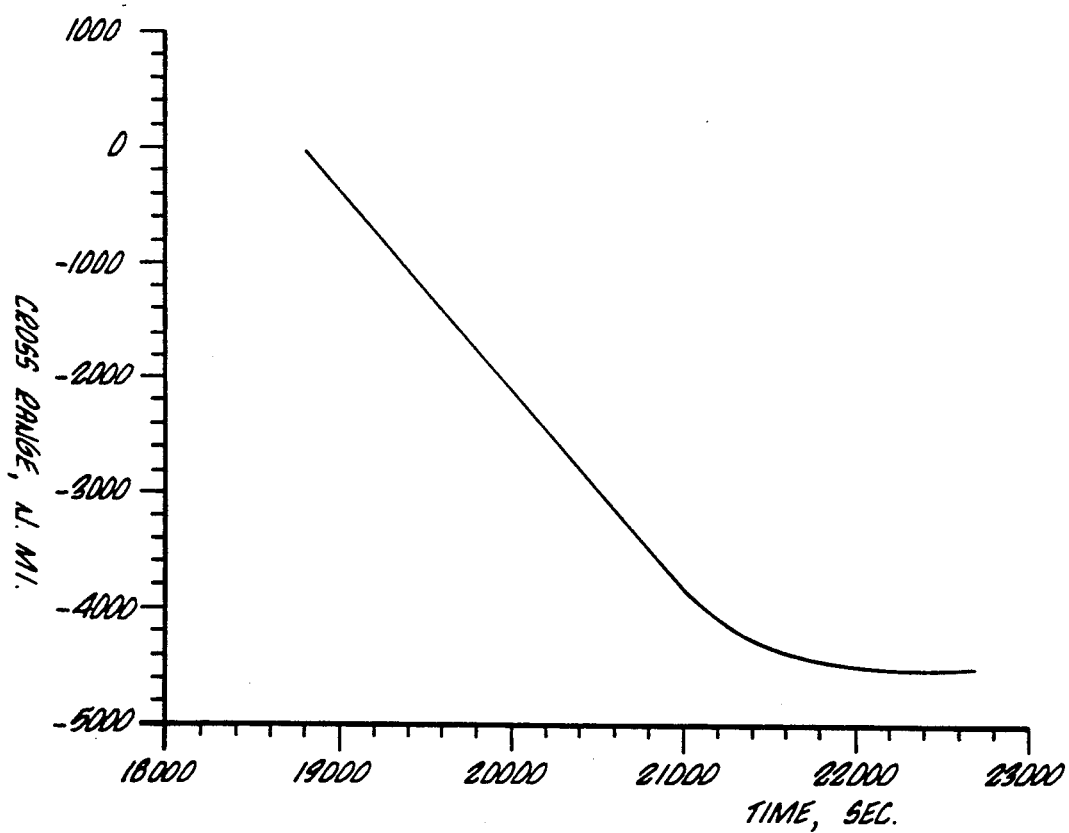
FIG. 21 provides a comparison of cross range in nautical miles to time for maximum cross range travel for the second stage returning to earth.
Figure 22:
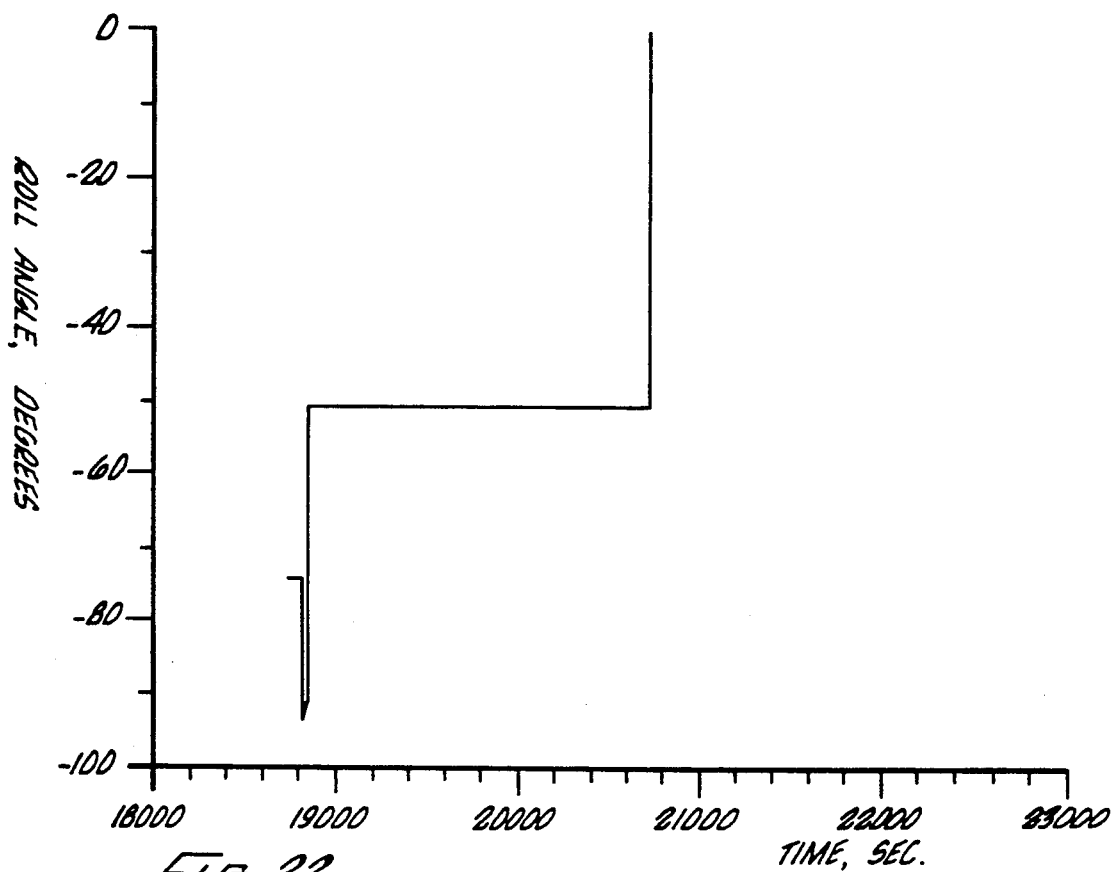
FIG. 22 illustrates role angle and degrees compared to time for the cross range trajectory of FIG. 21.
Figure 23:
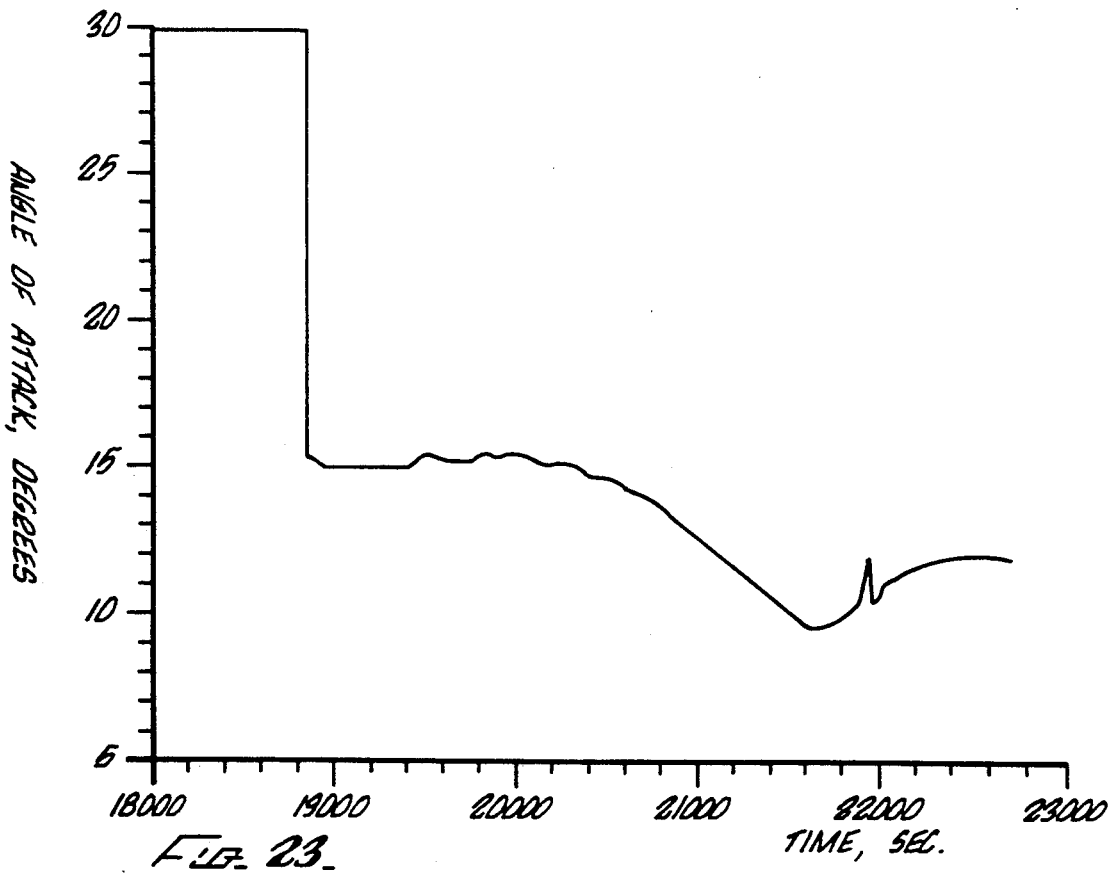
Figure 24:
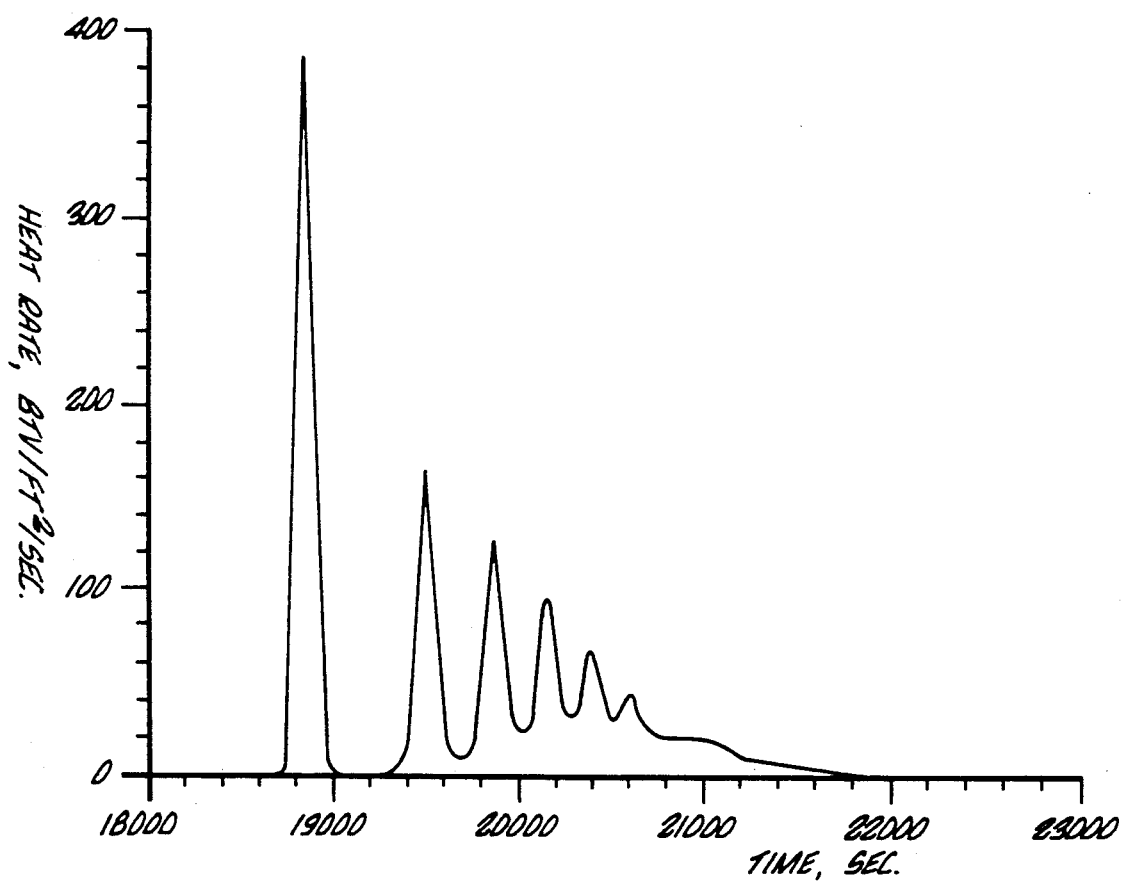
FIG. 24 illustrates the heat rate vs. time for reentry of the second stage.

FIG. 21 provides a comparison of cross range in nautical miles to time. FIG. 22 illustrates role angle and degrees compared to time. FIG. 23 illustrates the angle of attack vs. time while FIG. 24 illustrates the heat rate vs. time.

Accordingly, a system for launching projectiles has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A process for delivering a projectile to a remote earth location, comprising the steps of
    launching a first stage, a second stage and the projectile together to low earth orbit;
    launching the second stage with the projectile from the first stage to a geosynchronous orbit;
    returning the second stage with the projectile to atmospheric entry;

rebounding the second stage with the projectile toward an outward trajectory;

releasing the projectile while in the outward trajectory in a lob trajectory from the second stage;

returning the second stage to an earth location remote from the earth impact of the projectile.

2. A process for delivering a projectile to a remote earth location, comprising the steps of launching a first stage, a second stage and the projectile together to low earth orbit;

launching the second stage with the projectile from the first stage to geosynchronous orbit;

returning the second stage with the projectile to atmospheric entry;

rebounding the second stage with the projectile toward an outward trajectory;

releasing the projectile while in the outward trajectory in a lob trajectory from the second stage;

boosting the second stage to earth orbit after said step of releasing the projectile.

* * * * *